(12) United States Patent
Jeong et al.

(10) Patent No.: US 11,320,694 B2
(45) Date of Patent: May 3, 2022

(54) BACKLIGHT DEVICE AND DISPLAY APPARATUS INCLUDING THE SAME

(71) Applicant: SAMSUNG DISPLAY CO., LTD., Yongin-si (KR)

(72) Inventors: Minjae Jeong, Yongin-si (KR); Minkyu Woo, Yongin-si (KR); Misun Lee, Yongin-si (KR); Kyunghoon Chung, Yongin-si (KR); Chongchul Chai, Yongin-si (KR); Sungchul Hong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/928,177

(22) Filed: Jul. 14, 2020

(65) Prior Publication Data
US 2021/0026198 A1 Jan. 28, 2021

(30) Foreign Application Priority Data
Jul. 22, 2019 (KR) .......................... 10-2019-0088520

(51) Int. Cl.
*G09G 3/36* (2006.01)
*G02F 1/13357* (2006.01)
*G02F 1/1345* (2006.01)

(52) U.S. Cl.
CPC .... *G02F 1/133603* (2013.01); *G02F 1/13458* (2013.01); *G02F 1/133611* (2013.01); *G09G 3/3685* (2013.01); *G09G 3/3696* (2013.01)

(58) Field of Classification Search
CPC ......... G02F 1/133603; G02F 1/133611; G02F 1/13458; G09G 3/3685; G09G 3/3696
USPC .......................................................... 345/92
See application file for complete search history.

(56) References Cited

U.S. PATENT DOCUMENTS

| | | | |
|---|---|---|---|
| 7,633,233 B2 | 12/2009 | Sanchez | |
| 2007/0195044 A1* | 8/2007 | Uemoto | ............ G02F 1/133603 345/92 |
| 2017/0269432 A1 | 9/2017 | Lee et al. | |
| 2018/0356684 A1 | 12/2018 | Chang et al. | |

FOREIGN PATENT DOCUMENTS

| | | |
|---|---|---|
| JP | 2009245780 A | 10/2009 |
| KR | 1020050111323 A | 11/2005 |
| KR | 1020100118457 A | 11/2010 |
| KR | 101431590 B1 | 8/2014 |
| KR | 1020180028798 A | 3/2018 |
| KR | 1020180100164 A | 9/2018 |

* cited by examiner

*Primary Examiner* — Abdul-Samad A Adediran
(74) *Attorney, Agent, or Firm* — Cantor Colburn LLP

(57) ABSTRACT

A backlight device includes a substrate and a plurality of light emitters on the substrate. Each of the plurality of light emitters includes a brightness controller disposed on the substrate, and a pad unit disposed on the substrate. The brightness controller generates a light-emission current, a light-emitting diode is allowed to be disposed on the pad unit, and the light-emitting diode emits light based on the light-emission current.

20 Claims, 4 Drawing Sheets

BACKLIGHT DEVICE AND DISPLAY APPARATUS INCLUDING THE SAME

This application claims priority to Korean Patent Application No. 10-2019-0088520, filed on Jul. 22, 2019, and all the benefits accruing therefrom under 35 U.S.C. § 119, the content of which in its entirety is herein incorporated by reference.

BACKGROUND

1. Field

One or more embodiments relate to a backlight device and a display apparatus including the backlight device, and more particularly, to a backlight device including a light-emitting diode ("LED") and a display apparatus including the backlight device.

2. Description of the Related Art

It has become essential to mount a display apparatus in an electronic device as one user interface. A flat-panel display is widely used as a display apparatus in an electronic device to make the electronic device light, thin, short, and small and have low power consumption.

A liquid-crystal display ("LCD") apparatus is one type of flat-panel display apparatus. The LCD apparatus is an apparatus that displays an image by adjusting amount of light proceeding from outside. Thus, the LCD apparatus includes a backlight unit including an additional light source for emitting light toward a liquid-crystal panel, e.g., a backlight lamp.

SUMMARY

Recently, a light-emitting diode ("LED") having desired characteristics such as low power consumption, environmental friendliness, and slim design is widely used as a light source of a backlight unit. However, it may be difficult for a light source including the LED to maintain uniformity of brightness and colors on a whole area of a display apparatus. In addition, it is desired to improve instantaneous current control in the LED.

One or more embodiments relate to a backlight device with enhanced uniformity of brightness and life span.

One or more embodiments include a backlight device that may compensate for a deviation of threshold voltage of a driving thin-film transistor.

One or more embodiments include a display apparatus including the backlight device described above.

According to an embodiment, a backlight device includes a substrate, and a plurality of light emitters on the substrate. In such an embodiment, each of the plurality of light emitters includes a brightness controller disposed on the substrate, and a pad unit disposed on the substrate, where the brightness controller generates a light-emission current, a light-emitting diode is allowed to be disposed on the pad unit, and the light-emitting diode emits light based on the light-emission current.

According to an embodiment, a backlight device includes a substrate, a thin-film transistor including a semiconductor layer, a gate electrode, a first connection electrode, and a second connection electrode, wherein the semiconductor layer is disposed on the substrate and has a first area and a second area, the gate electrode at least partially overlaps the semiconductor layer, the first connection electrode is electrically connected to the first area, and the second connection electrode is electrically connected to the second area, a pad unit including a first pad and a second pad, where the second pad is connected to the first connection electrode, a data line disposed on the substrate, where the data line transmits a data voltage to the gate electrode, a first power line disposed on the substrate, where the first power line transmits a first driving voltage to the first pad, and a second power line disposed on the substrate and connected to the second connection electrode.

According to an embodiment, a display apparatus includes a backlight unit, and a display panel disposed on the backlight unit, where a plurality of pixels is disposed in the display panel. In such an embodiment, the backlight unit includes a substrate and a plurality of light emitters disposed on the substrate. In such an embodiment, each of the plurality of light emitters includes a thin-film transistor disposed on the substrate, where the thin-film transistor generates a light-emission current, a pair of pads on the substrate, and a light emitter disposed on the pair of pads and connected to the thin-film transistor in series such that the light emitter emits light based on the light-emission current.

BRIEF DESCRIPTION OF THE DRAWINGS

The above and other features of embodiments of the disclosure will be more apparent from the following description taken in conjunction with the accompanying drawings, in which.

DETAILED DESCRIPTION

Figure 1:
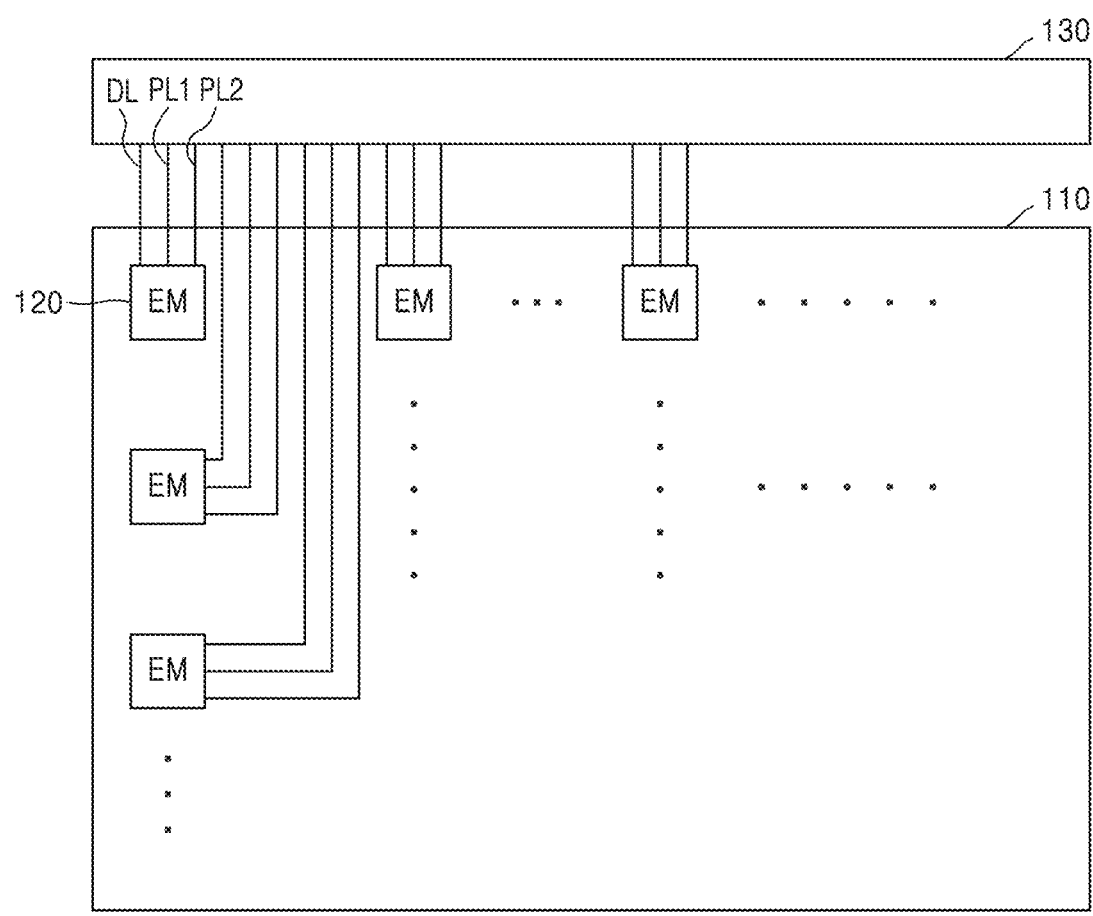
FIG. 1 is a schematic block diagram of a backlight device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region,"

"layer" or "section" discussed below could be termed a second element, component, region, layer or section without departing from the teachings herein.

Sizes of elements in the drawings may be exaggerated for convenience of explanation. In other words, since sizes and thicknesses of components in the drawings are arbitrarily illustrated for convenience of explanation, the present disclosure is not limited thereto.

It will be understood that when a layer, region, or component is referred to as being "connected to" or "coupled to" another layer, region, or component, it may be "directly connected or coupled" to the other layer, region, or component, or "indirectly connected to" the other layer, region, or component with intervening elements therebetween.

The terminology used herein is for the purpose of describing particular embodiments only and is not intended to be limiting. As used herein, the singular forms "a," "an," and "the" are intended to include the plural forms, including "at least one," unless the context clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The term "corresponding" or "in correspondence with" used herein may specify arrangement in or connection to a same column and/or a same row according to context. For example, connection of a first member to a "corresponding" second member among a plurality of second members indicates that the first member is connected to a second member arranged on a same column and/or a same row as that of the first member. For example, when a plurality of pixels circuits and a plurality light-emitting diodes are arranged on a substrate in a row direction and a column direction, respectively, connection of a light-emitting diode to a corresponding pixel circuit indicates that the light-emitting diode is connected to a pixel circuit arranged on a same column and a same row as those of the light-emitting diode among the plurality of pixel circuits.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein should be interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a schematic block diagram of a backlight device according to an embodiment.

Referring to FIG. 1, an embodiment of the backlight device includes a substrate 110 and a plurality of light emitters (referred to as "EM" in the drawings) 120 on the substrate 110.

The substrate 110 may be an insulating substrate including a transparent glass material having silicon oxide (SiO2) as a main component or a transparent plastic material. In an embodiment, the substrate 110 may be a glass substrate or a plastic substrate. In an alternative embodiment, the substrate 110 may be a conductive substrate including a thin-film metal material. The substrate 110 may be a flexible substrate or a rigid substrate.

A buffer layer (not shown) may be disposed or arranged on the substrate 110. In such an embodiment, the buffer layer effectively prevents the spread of impurity ions from the substrate 110 or penetration of moisture or external air from the substrate 110 and provides a flat surface to the substrate 110. The buffer layer may include an inorganic insulating material such as silicon oxide, silicon nitride, silicon oxynitride, aluminum oxide, aluminum nitride, titanium oxide or titanium nitride, for example. The buffer layer may include an organic insulating material such as polyimide, polyester or acryl, for example. Alternatively, the buffer layer may include a stack including layers of the above-described materials or a stack including a layer including an organic insulating material and a layer including an inorganic insulating material.

The light emitters 120 may be disposed or arranged on the substrate 110. The light emitters 120 may be arranged substantially in a form of a matrix. The light emitters 120 may be arranged with a predetermined interval or a preset space therebetween in a row direction and a column direction.

The number of the light emitters 120 is not particularly limited. In one embodiment, for example, thousands to hundreds of thousands of light emitters 120 may be used. In an embodiment, the number of the light emitters 120 may be determined in a way such that each of the light emitters 120 may be disposed or arranged on the substrate 110 to illuminate tens to hundreds of pixels when the backlight device provides light to a display panel. Each of the light emitters 120 may include a brightness controller and a pad unit. The light emitters 120 will be described in detail with reference to FIG. 2.

In an embodiment, a plurality of data lines DL, a plurality of first power lines PL1, and a plurality of second power lines PL2 may be disposed or arranged on the substrate 110. The light emitters 120 may be connected to the data lines DL, the first power lines PL1, and the second power lines PL2, respectively. In one embodiment, for example, a data line DL, a first power line PL1, and a second power line PL2 may be connected to a light emitter 120. The data line DL, the first power line PL1 and the second power line PL2 respectively connected to a light emitter 120 may be referred to as a corresponding data line DL of the light emitter 120 among the data lines DL, a corresponding first power line PL1 of the light emitter 120 among the first power lines PL1, and a corresponding second power line PL2 of the light emitter 120 among the second power lines PL2. In an embodiment, each of the data lines DL, the first power lines PL1, and the second power lines PL2 may be in a one-to-one correspondence with the light emitters 120. In such an embodiment, each of the numbers of the data lines DL, the first power lines PL1, and the second power lines PL2 may be the same as the number of the light emitters 120.

The data lines DL may transmit a data voltage for controlling brightness of light emitted from the light emitters 120. The first power lines PL1 may transmit a first driving voltage to the light emitters 120. The second power lines PL2 may transmit a second driving voltage to the light emitters 120. According to an embodiment, a level of the first driving voltage may be higher than a level of the second driving voltage, but not being limited thereto. Alternatively, the level of the second driving voltage may be higher than the level of the first driving voltage. Hereinafter, for convenience of description, embodiments in which a level of the first driving voltage is higher than a level of the second driving voltage will be described in detail. In such embodiments, the first driving voltage may be denoted, for example, as VDD, and the second driving voltage may be denoted, for example, as VSS.

According to an embodiment, the backlight device may further include a driving board 130. The driving board 130 may be connected to the substrate 110, output data voltages to the data lines DL, and provide the first and second driving voltages to the first and second power lines PL1 and PL2, respectively. The driving board 130 may be a flexible printed circuit board ("FPCB"). Source integrate circuit ("IC") chips may be disposed or mounted on the driving board 130, and the source IC chips may output data voltages to the data lines DL. Power pads and wires may be disposed or arranged on the driving board 130, and the power pads receive the first and second driving voltages from outside and the wires connect the power pads to the first and second power lines PL1 and PL2. A microcontroller, a timing controller, or the like may be disposed or mounted on the driving board 130, and the microcontroller or the timing controller is configured to drive a display panel.

The driving board 130 may be referred to as an external device connected to the substrate 110 to drive the light emitters 120. In one embodiment, for example, the driving board 130 may include a first driving board and a second driving board, and source IC chips configured to output data voltages to the data lines DL are disposed or mounted on the first driving board and a power chip configured to generate the first and second driving voltages is disposed or mounted on the second driving board. According to an alternative embodiment, the driving board 130 may include a third driving board including a sensor configured to sense a magnitude of driving current flowing through each of the light emitters 120.

Figure 2:
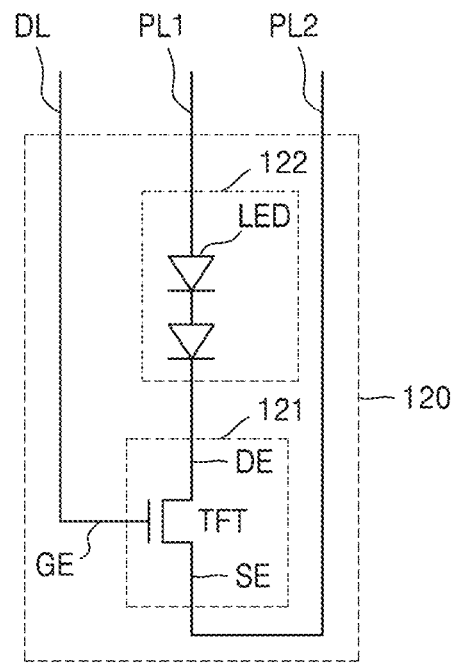
FIG. 2 is a schematic circuit diagram of a light emitter according to an embodiment.

FIG. 2 is a schematic circuit diagram of a light emitter 120 according to an embodiment.

Referring to FIG. 2, the light emitter 120 may include a brightness controller 121 and a pad unit 122, on which a light-emitting diode LED is disposed or mounted. A data line DL, a first power line PL1, and a second power line PL2 may be connected to the light emitter 120. One of the light emitters 120 disposed or arranged on the substrate 110 is shown in FIG. 2. Other light emitters 120 on the substrate 110 may have substantially a same circuit configuration as that of the light emitter 120 shown in FIG. 2.

The brightness controller 121 may include a thin-film transistor TFT configured to generate a light-emission current flowing from a drain electrode DE to a source electrode SE based on a data voltage applied to a gate electrode GE via the data line DL. The thin-film transistor TFT may generate a light-emission current with a magnitude corresponding to a level of the data voltage applied to the gate electrode GE. When a level of the data voltage applied to the gate electrode GE becomes higher, a light-emission current with a greater magnitude may be generated. The light-emission current may flow from the first power line PL1 to the second power line PL2 via light-emitting diodes LED.

The thin-film transistor TFT may include the gate electrode GE, the source electrode SE, and the drain electrode DE. The gate electrode GE may be connected to a corresponding data line DL to thereby receive a data voltage. In an embodiment, as shown in FIG. 2, the drain electrode DE may be connected to a cathode of the light-emitting diode LED. The cathode of the light-emitting diode LED may be referred to as a second electrode. The source electrode SE may be connected to a corresponding second power line PL2. An anode of the light-emitting diode LED may be referred to as a first electrode and connected to a corresponding first power line PL1. The drain electrode DE may be referred to as a first connection electrode. The source electrode SE may be referred to as a second connection electrode.

The light-emitting diode LED is connected to the thin-film transistor TFT in series. The light-emitting diode LED emits light corresponding to driving current generated from the thin-film transistor TFT in the brightness controller 121. In an embodiment, as shown in FIG. 2, the light-emitting diode LED may include a plurality of light-emitting diodes LED connected to each other in series. FIG. 2 shows an embodiment where two light-emitting diodes LED are connected to each other. However, this is merely exemplary. In an alternative embodiment, a single light-emitting diode LED or three or more light-emitting diodes LED may be connected to the thin-film transistor TFT in series. Hereinafter, embodiments where two light-emitting diodes LED are connected to each other in series will be described in detail. In an embodiment, the number of light-emitting diodes LED included in a light emitter 120 may be variously modified in consideration of brightness of the light-emitting diodes LED, a driving capacity of the thin-film transistor TFT, and a radiation structure of the backlight device.

The pad unit 122 may include pads on which a light-emitting diode LED is disposed or mounted. The pad unit 122 may include a pair of pads including a first pad and a second pad, and the first pad is connected to a first electrode of a light-emitting diode LED and the second pad is connected to a second electrode of a light-emitting diode LED. In an embodiment, as shown in FIG. 2, the pad unit 122 may include two pairs of pads and the two light-emitting diodes LED are disposed or mounted thereon, respectively. Each of the pair of pads may be apart from each other to dissipate heat.

In an embodiment, as illustrated in FIG. 2, the thin-film transistor TFT may be an n-type metal-oxide-semiconductor field-effect transistor ("MOSFET"). However, this is merely exemplary. In an alternative embodiment, the thin-film transistor TFT may be implemented as a p-type MOSFET. In such an embodiment, a level of the second driving voltage may be higher than a level of the first driving voltage. In such an embodiment, connection of a light-emitting diode LED may be performed in a way opposite to the method described above. In such an embodiment, the anode of the light-emitting diode LED may be connected to the drain electrode DE, and the cathode of the light-emitting diode LED may be connected to the first power line PL1. In such an embodiment, the thin-film transistor implemented as the p-type MOSFET may generate a light-emission current with a great magnitude when a level of a data voltage applied to the gate electrode GE is low. The light-emission current flows from the source electrode SE to the drain electrode DE through the light-emitting diodes LED.

Figure 3:
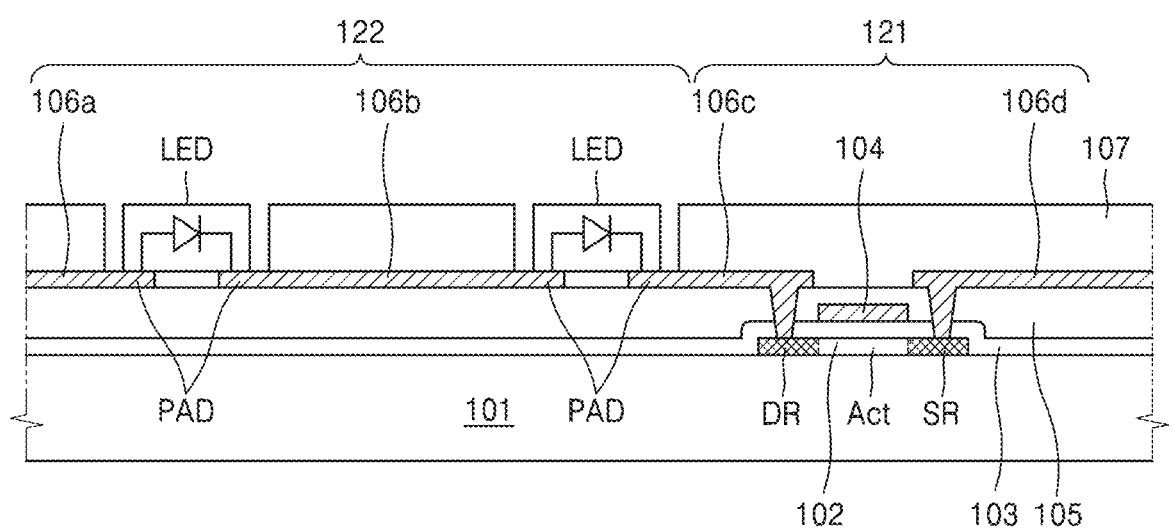
FIG. 3 is a schematic cross-sectional view of the light emitter according to an embodiment.

FIG. 3 is a schematic cross-sectional view of a light emitter 120 according to an embodiment.

Referring to FIGS. 2 and 3, an embodiment of the light emitter 120 includes the brightness controller 121, the light-emitting diodes LED, and pads PAD on which the light-emitting diodes LED are disposed or mounted.

The brightness controller 121 may include a substrate 101, a semiconductor layer 102 on the substrate 101, a gate electrode 104, a first connection electrode 106c, and a second connection electrode 106d. The substrate 101 and the substrate 110 as shown in FIG. 1 may be the same substrate or different substrates.

The substrate 101 may be a base substrate, on which the brightness controller 121, including the thin-film transistor TFT, and the pad unit 122 may be provided or formed by a semiconductor process. A buffer layer may be disposed or stacked on the substrate 101.

The semiconductor layer 102 includes a source area SR and a drain area DR, each doped with an impurity to thereby have conductivity. The semiconductor layer 102 includes an active area Act between the source area SR and the drain area DR. The drain area DR may be referred to as a first area. The source area SR may be referred to as a second area.

In an embodiment, a polysilicon layer (not shown) may be formed by depositing a semiconductor material layer (not shown), e.g., an amorphous silicon layer on the substrate 101, and then, crystallizing the semiconductor material layer. Amorphous silicon may be crystallized by using at least one of various methods such as a rapid thermal annealing ("RTA") method, a solid-phase crystallization method ("SPC"), an excimer laser annealing ("ELA") method, a metal-induced crystallization ("MIC") method, a metal induced lateral crystallization ("MILC") method or a sequential lateral solidification ("SLS"), for example. The polysilicon layer formed as described above may be patterned to form an active pattern by using a photolithography process. According to an alternative embodiment, the amorphous silicon layer may be patterned, and then, crystallized to thereby form an active pattern. A selective ion injection process may be performed on the source area SR and the drain area DR to thereby inject an impurity. Resultantly, the source area SR, the active area Act, and the drain area DR may be formed in the active pattern.

In an embodiment, the semiconductor layer 102 may include a silicon-based element semiconductor, but not being limited thereto. In an alternative embodiment, the semiconductor layer 102 may include a compound semiconductor, e.g., an oxide semiconductor or an organic material semiconductor.

A gate insulating layer 103 may be disposed or arranged on the semiconductor layer 102. The gate insulating layer 103 may include oxide, nitride, oxynitride, or a combination thereof.

A gate electrode 104 may be disposed or arranged on the gate insulating layer 103, and the gate electrode 104 at least partially overlaps the active area Act of the semiconductor layer 102. A conductive material layer (not shown) is disposed or stacked on the gate insulating layer 103. The conductive material layer may be patterned to form the gate electrode 104 through a photolithography process and an etching process. The gate electrode 104 may include a metal or an alloy of metal such as molybdenum (Mo), molybdenum tungsten (MoW), an aluminum (Al)-based alloy, or the like, but not being limited thereto. Alternatively, the gate electrode 104 may have a stacked structure including Mo/Al/Mo.

The gate electrode 104 may function as a mask in a process of injecting an impurity into the source area SR and the drain area DR. The active area Act is the semiconductor layer 102 between the source area SR and the drain area DR. The active area Act may be defined as a portion overlapping the gate electrode 104.

An interlayer insulating layer 105 may be disposed or arranged on the gate electrode 104. Contact holes may be defined in the gate insulating layer 103 and the interlayer insulating layer 105, where the contact holes respectively expose the source area SR and the drain area DR of the semiconductor layer 102.

An electrode material layer may be disposed or stacked on the interlayer insulating layer 105. The electrode material layer may include a metal such as Mo, chromium (Cr), tungsten (W), aluminum-neodymium (Al—Nd), titanium (Ti), MoW, or Al.

The electrode material layer may be patterned as a first wire 106a, a second wire 106b, a first connection electrode 106c, and a second connection electrode 106d. The first connection electrode 106c and the second connection electrode 106d may be connected to the drain area DR and the source area SR, respectively, via the contact holes in the gate insulating layer 103 and the interlayer insulating layer 105.

An end of the first wire 106a and an end of the second wire 106b may constitute a pair of pads PAD on which the light-emitting diode LED may be disposed or mounted. The end of the first wire 106a may be referred to as a first pad. The end of the second wire 106b may be referred to as a second pad. Another end of the second wire 106b and an end of the first connection electrode 106c may also constitute a pair of pads PAD on which the light-emitting diode LED may be disposed or mounted. The other end of the second wire 106b may be referred to as a first pad. The end of the first connection electrode 106c may be referred to as a second pad. The first connection electrode 106c may connect the second pad to the drain area DR. The first pad may be connected to a first electrode of the light-emitting diode LED, e.g., an anode. The second pad may be connected to a second electrode of the light-emitting diode LED, e.g., a cathode.

A protective layer 107 may be disposed or arranged on the first wire 106a, the second wire 106b, the first connection electrode 106c, and the second connection electrode 106d to expose the pads PAD. The protective layer 107 may be referred to as a planarization layer or a passivation layer. The protective layer 107 may include an inorganic insulating material or an organic insulating material.

The light-emitting diodes LED may be disposed or mounted on the pair of pads PAD, respectively. The light-emitting diode LED may be a small-sized light-emitting diode. Although not illustrated in FIG. 3, the first wire 106a may be connected to the first power line PL1, and the second connection electrode 106d may be connected to the second power line PL2. The gate electrode 104 may be connected to the data line DL.

Although not illustrated in FIG. 3, auxiliary wires on a same layer as the gate electrode 104 may be disposed or arranged below the first wire 106a and the second wire 106b. The auxiliary wires may be connected to the first wire 106a and the second wire 106b via a contact plug.

Figure 4:
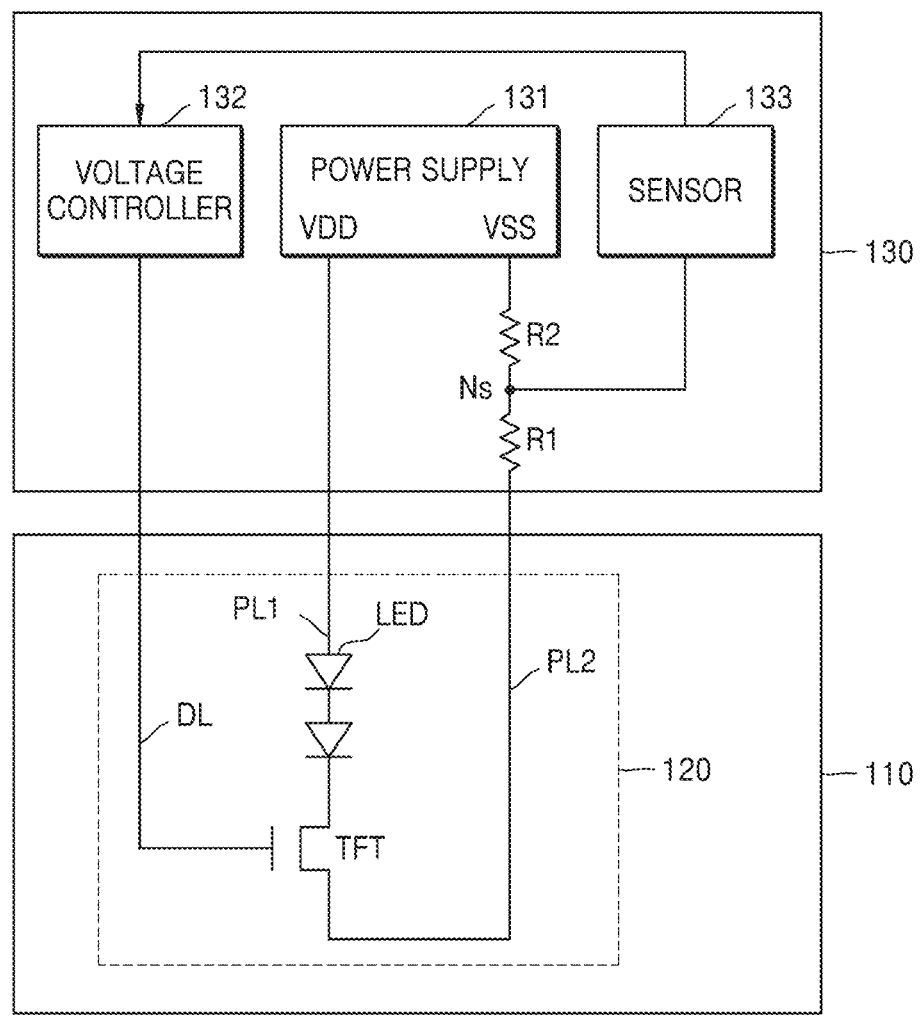
FIG. 4 is a schematic block diagram of a backlight device according to an alternative embodiment.

FIG. 4 is a schematic block diagram of a backlight device according to an alternative embodiment.

Referring to FIG. 4, an embodiment of the backlight device includes the substrate 110, the light emitter 120 on the substrate 110, and the driving board 130. For convenience of illustration, FIG. 4 shows only a single light emitter 120 is disposed on the substrate 110. However, as shown in FIG. 1, the plurality of light emitters 120 may be arranged on the substrate 110 in a matrix form. The light emitters 120 are substantially same as those described above with reference to FIGS. 2 and 3, and any repetitive detailed description thereof will be omitted. For convenience of illustration, FIG. 4 shows a single data line DL, a single first power line PL1, and a single second power line PL2, each arranged on the substrate 110 and connected to the light emitter 120. However, as shown in FIG. 1, a plurality of the data lines DL, a plurality of the first power lines PL1, and a plurality of the second power lines PL2 may be connected to the plurality of light emitters 120.

The driving board 130 may include a voltage controller 132, a power supply 131, and a sensor 133. The driving board 130 includes a first resistor R1 and a second resistor R2 connected to each other in series between the second power line PL2 and the power supply 131. In an embodiment, where the second power line PL2 is provided in plural, the driving board 130 may include a plurality of first resistors R1 and a plurality of second resistor R2.

The power supply 131 may supply a first driving voltage VDD to the first power lines PL1 and supply a second driving voltage VSS to the second power lines PL2. The power supply 131 may generate the first driving voltage VDD and the second driving voltage VSS. According to an alternative embodiment, the power supply 131 receive the first driving voltage VDD and the second driving voltage VSS from an outside and transmit the first driving voltage VDD and the second driving voltage VSS to the first power lines PL1 and the second power lines PL2, respectively.

The voltage controller 132 may output a data voltage to each of the data lines DL. The voltage controller 132 may control light-emission brightness of the light emitters 120 by controlling a level of the data voltage. According to an embodiment, some areas of the display panel may be desired to display full black. In such an embodiment, the voltage controller 132 may provide a non-light-emission data voltage to the light emitters 120 corresponding to areas where full black is to be displayed. Thus, the partial areas may display full black without any leakage of light.

A voltage of a sensing node Ns between the first resistor R1 and the second resistor R2 may be sensed by the sensor 133. A voltage drop is reflected in a voltage of the sensing node Ns, and the voltage drop corresponds to a value obtained by multiplying driving current generated by the thin-film transistor TFT by a resistance value of the second resistor R2. The sensor 133 may sense a magnitude of the driving current based on the voltage of the sensing node Ns. The sensor 133 may provide information about the sensed voltage of the sensing node Ns or the sensed magnitude of the driving current to the voltage controller 132. The voltage controller 132 may adjust a level of a data voltage based on the information about the voltage of the sensing node Ns or the magnitude of the driving current.

In one embodiment, for example, the light emitters 120 may be configured to emit light with brightness of 100 when the voltage controller 132 applies a data voltage (e.g., 5 volts (V)) to the light emitters 120. When a magnitude of driving current sensed by the sensor 133 is a magnitude of current corresponding to brightness of 90, the voltage controller 132 may increase a magnitude of the data voltage applied to the light emitters 120 so that the light emitters 120 emit light with brightness of 100. Such a process may be performed in real time. In one embodiment, for example, the voltage controller 132 may increase or decrease a data voltage until a magnitude of driving current sensed by the sensor 133 becomes a magnitude of current corresponding to target brightness. The voltage controller 132 may be implemented as a source IC having a plurality of channel so that a plurality of data voltages are output to the plurality of data lines DL.

Thin-film transistors TFT may have different threshold voltages due to a manufacture tolerance, for example. In addition, a magnitude of a threshold voltage may vary with time depending on deterioration. According to an embodiment, a magnitude of driving current generated by the thin-film transistors TFT may be sensed and, the data voltage may be adjusted based on the sensed magnitude of the driving current. Thus, the light emitters 120 may emit light with accurate brightness. In such an embodiment, resistance values of the second resistors R2 may be identical to each other.

Resistance values of the first resistors R1 may be different from each other. In an embodiment, lengths of the first power lines PL1 and the second power lines PL2 may be different from one another according to positions of the light emitters 120 on the substrate 110. In one embodiment, for example, lengths of the first power lines PL1 and the second power lines PL2 connected to the light emitters 120 located adjacent to the driving board 130 may be relatively small, such that a sum of line resistances of the first power line PL1 and the second power line PL2 may be relatively small. In such an embodiment, lengths of the first power line PL1 and the second power line PL2 connected to the light emitters 120 located far from the driving board 130 may be relatively great, such that a sum of line resistances of the first power line PL1 and the second power line PL2 may be relatively great. The first resistors R1 may have resistance values for compensating for the sum of the line resistances of the first power line PL1 and the second power line PL2.

In an embodiment, a resistance value of the first resistor R1 may be designed so that a sum of a resistance value of the first power line PL1, a resistance value of the second power line PL2, and a resistance value of the first resistor R1 is constant for the light emitters 120 in different positions. Accordingly, a voltage of the sensing node Ns sensed by the sensor 133 may accurately reflect driving current flowing through all the light emitters 120. According to an alternative embodiment, a sum of lengths of the first power line PL1 and the second power line PL2 for the light emitters 120 in different positions may be designed to be constant so that a resistance value of the first power line PL1 and a resistance value of the second power line PL2 are constant. In such an embodiment, at least one of the first power line PL1 and the second power lines PL2 may have a zigzag shape to increase a resistance value.

FIG. 4 shows an embodiment where the power supply 131, the voltage controller 132, and the sensor 133 are disposed or mounted on or included in one driving board 130. However, this is merely exemplary. In an alternative embodiment, the voltage controller 132 may be disposed or mounted on the driving board 130, while a power generator configured to generate the first and second driving voltages VDD and VSS and the sensor 133 may be disposed or mounted on a driving board configured to drive the display panel. In an embodiment, a driving board constituting the backlight device and the driving board configured to drive the display panel may be integrated as a single driving board.

Figure 5:
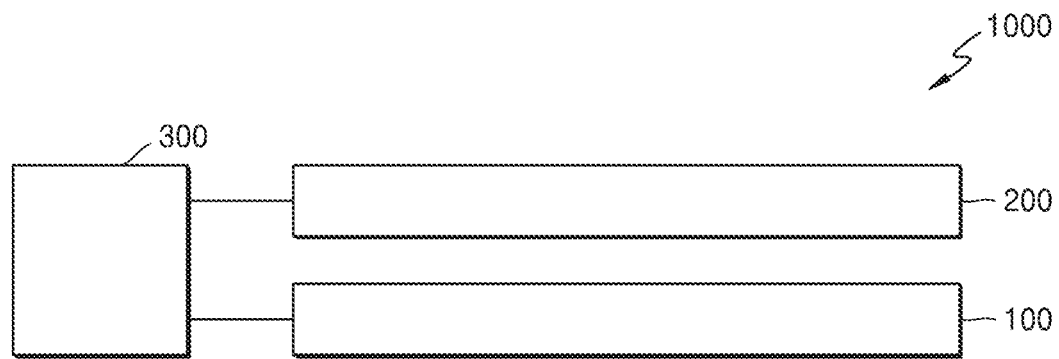
FIG. 5 is a schematic block diagram of a display apparatus according to an embodiment.

FIG. 5 is a schematic block diagram of a display apparatus 1000 according to an embodiment.

Referring to FIG. 5, an embodiment of the display apparatus 1000 includes a backlight unit 100 and a display panel 200. The display panel 200 is disposed or arranged on the backlight unit 100. A plurality of pixels may be disposed or arranged in the display panel 200.

The backlight unit 100 may correspond to the backlight device of FIGS. 1 to 4. The backlight unit 100 includes a substrate and a plurality of light emitters on the substrate.

Each of the light emitters is disposed or arranged on the substrate. Each of the light emitters includes a thin-film transistor, a pair of pads on the substrate, and a light emitter. In such an embodiment, the thin-film transistor generates a light-emission current and the light emitter is disposed or mounted on the pair of pads and connected to the thin-film transistor in series to thereby emit light corresponding to the light-emission current.

As light is emitted from the light emitters of the backlight unit 100 toward the display panel 200 and a light transmittance of pixels is adjusted based on received image data, the display panel 200 may display an image. The display panel 200 may be a liquid-crystal display panel including a liquid-crystal layer.

The controller 300 may drive the backlight unit 100 and the display panel 200. The controller 300 may include the voltage controller 132 and the sensor 133, as shown in FIG. 4. The controller 300 may include a timing controller (not shown), a scan driver and a data driver, and the timing controller drives the display panel 200. The controller 300 may further include the power supply 131 of FIG. 4.

Figure 6:
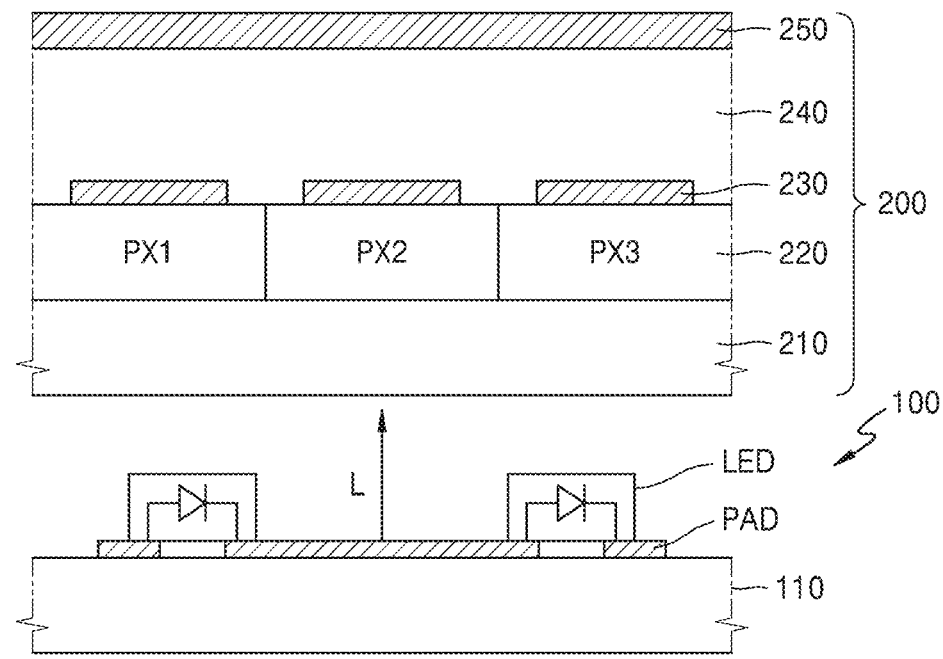
FIG. 6 is a schematic cross-sectional view illustrating a portion of the display apparatus of FIG. 5.

FIG. 6 is a schematic cross-sectional view illustrating a portion of a display apparatus 1000 of FIG. 5.

Referring to FIGS. 5 and 6, an embodiment of the display apparatus 1000 includes the backlight unit 100 and the display panel 200, which is a liquid-crystal display panel on the backlight unit 100. In an embodiment, the display apparatus 1000 may include a color filter (not shown) disposed or arranged between the backlight unit 100 and the liquid-crystal display panel 200 or on the liquid-crystal display panel 200.

The backlight unit 100 may provide light L for displaying an image on the liquid-crystal display panel 200. The backlight unit 100 includes the substrate 110 and the plurality of light emitters 120 on the substrate 110. The light emitters 120 respectively include the light-emitting diode LED, the pad unit 122, and the brightness controller 121. In such an embodiment, the light-emitting diode LED emits the light L, the light-emitting diode LED is disposed or mounted on the pad unit 122, and the brightness controller 121 controls brightness of the light-emitting diode LED.

The liquid-crystal display panel 200 includes a lower substrate 210, a pixel circuit 220 on the lower substrate 210, the pixel electrode 230, the liquid-crystal layer 240, and a common electrode 250. The pixel circuit 220 includes first to third pixels PX1, PX2, and PX3. Each of the first to third pixels PX1, PX2, and PX3 controls the pixel electrode 230 disposed or arranged thereon.

The lower substrate 210 may include a glass or a transparent plastic material. A lower polarizer (not shown) may be disposed or arranged on a lower surface of the lower substrate 210, and the lower polarizer transmits only light of particular polarization, among light emitted from the backlight unit 100. In one embodiment, for example, the lower polarizer may be a polarization plate configured to transmit light line-polarized in a first direction.

The pixel circuit 220 may include a plurality of thin-film transistors (not shown), and a gate line and a data line configured to apply a gate signal and a data signal, respectively, to the plurality of thin-film transistors.

The pixel electrode 230 may be connected to a source or drain electrode of the thin-film transistor in the pixel circuit 220 to thereby receive a data voltage.

The common electrode 250 may be disposed or arranged on the liquid-crystal layer 240. An upper polarizer (not shown) may be disposed or arranged on the common electrode 250. The upper polarizer may be a polarization plate configured to transmit light of line polarization in a second direction perpendicular to light of line polarization in a first direction transmitted by the lower polarizer. However, this is merely exemplary. Alternatively, both of the upper polarizer and the lower polarizer may be configured to transmit light of same polarization.

The liquid-crystal layer 240 is disposed or arranged between the pixel electrode 230 and the common electrode 250. In an embodiment, arrangement of liquid-crystal molecules in the liquid-crystal layer 240 is adjusted based on a voltage applied between the pixel electrode 230 and the common electrode 250. In such an embodiment, an area of the liquid-crystal layer 240 between the pixel electrode 230 and the common electrode 250 is controlled, based on a voltage applied between the pixel electrode 230 and the common electrode 250, to a turn-on mode in which polarization of incident light is changed or a turn-off mode in which polarization of incident light is not changed. In an embodiment, a degree in which polarization of incident light is changed is adjusted so that an intermediate gray scale may be represented.

As the light L controlled by the liquid-crystal layer 240 on the first pixel PX1 passes through a first color filter layer, the light L is displayed as light of a first color (e.g., red). As the light L controlled by the liquid-crystal layer 240 on the second pixel PX2 passes through a second color filter layer, the light L is displayed as light of a second color (e.g., green). As the light L controlled by the liquid-crystal layer 240 on the third pixel PX3 passes through a third color filter layer, the light L is displayed as light of a third color (e.g., blue).

When the light L emitted from the backlight unit 100 is provided to the liquid-crystal display panel 200, the light L passing through the liquid-crystal display panel 200 may be selectively transmitted or blocked in each pixel area based on image information to thereby be selectively incident on a color filter. The color filter selectively transmits only some colors of the light L that passed through the liquid-crystal display panel 200 according to the pixel PX1, PX2, or PX3 so that a color image may be displayed.

According to embodiments, pads and a thin-film transistor are disposed or arranged directly on a glass substrate, a light-emitting diode may be disposed or mounted on the pads and the thin-film transistor may control brightness of a light-emitting diode. Thus, a manufacture cost may be reduced, and product reliability and life-span may be enhanced. A deviation of a voltage drop and a deviation of a threshold voltage of a thin-film transistor due to length difference between wires may be effectively compensated. Thus, brightness uniformity of a backlight device may improve. According to embodiments, a display apparatus including a backlight unit in which brightness uniformity is improved may enhance display quality.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A backlight device comprising:
   a substrate; and
   a plurality of light emitters on the substrate,
   wherein each of the plurality of light emitters comprises:
      a brightness controller comprising a thin-film transistor disposed on the substrate, wherein the thin-film transistor generates a light-emission current with a magnitude corresponding to a level of a data voltage applied to the thin-film transistor; and
      a pad unit disposed on the substrate, wherein a light-emitting diode is disposed on the pad unit, and the thin-film transistor drives the light-emitting diode to emit light based on the light-emission current.

2. The backlight device of claim 1,
   wherein the thin-film transistor comprises:
      a semiconductor layer disposed on the substrate and including a first area and a second area;
      a gate electrode at least partially overlapping the semiconductor layer;
      a first connection electrode electrically connected to the first area; and
      a second connection electrode electrically connected to the second area, and
   the thin-film transistor generates the light-emission current with the magnitude corresponding to the level of the data voltage applied to the gate electrode.

3. The backlight device of claim 2, wherein
   the pad unit comprises
      a first pad to be connected to a first electrode of the light-emitting diode, and
      a second pad connected to the first connection electrode and to be connected to a second electrode of the light-emitting diode.

4. The backlight device of claim 3, further comprising:
   a plurality of data lines on the substrate;
   a plurality of first power lines on the substrate; and
   a plurality of second power lines on the substrate,
   wherein each of the plurality of light emitters is connected to a corresponding data line from among the plurality of data lines, a corresponding first power line from among the plurality of first power lines, and a corresponding second power line from among the plurality of second power lines.

5. The backlight device of claim 4, wherein
   the corresponding data line is connected to the gate electrode,
   the corresponding first power line is connected to the first pad, and
   the corresponding second power line is connected to the second connection electrode.

6. The backlight device of claim 5, further comprising:
   a driving board connected to the substrate,
   wherein the driving board comprises:
      a voltage controller which outputs the data voltage to the corresponding data line; and
      a power supply which outputs a first driving voltage to the corresponding first power line and a second driving voltage to the corresponding second power line.

7. The backlight device of claim 6, wherein
   the driving board further comprises a first resistor and a second resistor connected to each other in series between the corresponding second power line and the power supply.

8. The backlight device of claim 7, wherein
   the driving board further comprises a sensor which senses a voltage of a sensing node between the first resistor and the second resistor.

9. The backlight device of claim 8,
   wherein the voltage controller adjusts a level of the data voltage based on the voltage of the sensing node sensed by the sensor.

10. The backlight device of claim 7, wherein
    the first resistor has a resistance value corresponding to a distance between a light emitter corresponding thereto and the power supply, and
    the light emitter corresponding to the first resistor is connected to the first resistor between the corresponding second power line and the power supply via the corresponding second power line.

11. The backlight device of claim 1, wherein
    the pad unit is provided in plural such that a plurality of light-emitting diodes is disposed thereon, and
    the plurality of light-emitting diodes is connected to one another in series and emits light based on the light-emission current.

12. A backlight device comprising:
    a substrate;
    a thin-film transistor comprising a semiconductor layer, a gate electrode, a first connection electrode, and a second connection electrode, wherein the semiconductor layer is disposed on the substrate and includes a first area and a second area, the gate electrode at least partially overlaps the semiconductor layer, the first connection electrode is electrically connected to the first area, and the second connection electrode is electrically connected to the second area;
    a pad unit comprising a first pad and a second pad, wherein the second pad is connected to the first connection electrode;
    a data line disposed on the substrate, wherein the data line transmits a data voltage to the gate electrode;
    a first power line disposed on the substrate, wherein the first power line transmits a first driving voltage to the first pad; and
    a second power line disposed on the substrate and connected to the second connection electrode.

13. The backlight device of claim 12, further comprising a light-emitting diode disposed on the first pad and the second pad,
wherein a first electrode of the light-emitting diode is connected to the first pad, and
a second electrode of the light-emitting diode is connected to the second pad.

14. The backlight device of claim 12, further comprising:
a first resistor connected between the second power line and a sensing node; and
a second resistor connected between the sensing node, and a node to which a second driving voltage is applied.

15. The backlight device of claim 14, wherein
a resistance value of the first resistor decreases as a sum of a length of the first power line and a length of the second power line increases.

16. The backlight device of claim 14, further comprising a voltage controller adjusts a level of the data voltage based on a voltage of the sensing node.

17. The backlight device of claim 12, further comprising:
a plurality of light emitters disposed on the substrate,
wherein each of the plurality of light emitters comprises the thin-film transistor and the pad unit.

18. A display apparatus comprising:
a backlight unit; and
a display panel disposed on the backlight unit, wherein a plurality of pixels are disposed in the display panel,
wherein the backlight unit comprises a substrate and a plurality of light emitters disposed on the substrate, and each of the plurality of light emitters comprises:
a thin-film transistor disposed on the substrate, wherein the thin-film transistor generates a light-emission current, and the thin-film transistor generates the light-emission current with a magnitude corresponding to a level of a data voltage applied to the thin-film transistor;
a pair of pads on the substrate; and
a light emitter disposed on the pair of pads and connected to the thin-film transistor in series such that the thin-film transistor drives the light emitter to emit light based on the light-emission current.

19. The display apparatus of claim 18, wherein
the thin-film transistor comprises:
a semiconductor layer disposed on the substrate and including a first area and a second area;
a gate electrode at least partially overlapping the semiconductor layer;
a first connection electrode connected between the first area and a pad among the pair of pads; and
a second connection electrode electrically connected to the second area, and
the thin-film transistor generates the light-emission current with the magnitude corresponding to the level of the data voltage applied to the gate electrode.

20. The display apparatus of claim 19, wherein the backlight unit further comprises:
a first resistor and a second resistor connected to each other in series and to the second connection electrode; and
a voltage controller which adjusts a level of a data voltage to be applied to the gate electrode based on a voltage of a sensing node between the first resistor and the second resistor.

* * * * *